(12) United States Patent
Mueller et al.

(10) Patent No.: US 10,132,940 B2
(45) Date of Patent: Nov. 20, 2018

(54) RADIOMETRIC MEASURING DEVICE

(71) Applicant: Berthold Technologies GmbH & Co. KG, Bad Wildbad (DE)

(72) Inventors: Steffen Mueller, Pforzheim (DE); Ewald Freiburger, Neulingen (DE); Tobias Daibenzeiher, Neuenbuerg (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 0 days.

(21) Appl. No.: 15/566,736

(22) PCT Filed: May 20, 2016

(86) PCT No.: PCT/EP2016/061469
§ 371 (c)(1),
(2) Date: Oct. 16, 2017

(87) PCT Pub. No.: WO2016/185028
PCT Pub. Date: Nov. 24, 2016

(65) Prior Publication Data
US 2018/0120454 A1    May 3, 2018

(30) Foreign Application Priority Data

May 21, 2015    (DE) .................. 10 2015 209 366

(51) Int. Cl.
*G01T 1/20* (2006.01)
*G01T 1/175* (2006.01)
(52) U.S. Cl.
CPC ............ *G01T 1/2018* (2013.01); *G01T 1/175* (2013.01)

(58) Field of Classification Search
CPC ........... G01T 1/2018; G01F 23/00; G01J 1/42
See application file for complete search history.

(56) References Cited

U.S. PATENT DOCUMENTS 6,879,425 B2    4/2005    Damm et al.
2008/0007307 A1    1/2008    Freiburger et al.
(Continued)

FOREIGN PATENT DOCUMENTS

DE              100 43 629 A1    3/2002
DE        10 2007 053 860 A1    5/2009
(Continued)

OTHER PUBLICATIONS

International Search Report (PCT/ISA/210) issued in PCT Application No. PCT/EP2016/061469 dated Jul. 28, 2016 with English translation (7 pages).
(Continued)

*Primary Examiner* — Kenneth J Malkowski
(74) *Attorney, Agent, or Firm* — Crowell & Moring LLP

(57) ABSTRACT

A radiometric measuring device includes a scintillator, at least one semiconductor photodiode, wherein the at least one semiconductor photodiode is optically coupled to the scintillator, a signal evaluation unit which is electrically coupled to the at least one semiconductor photodiode and is designed to determine a measurement variable on the basis of a measurement signal produced by way of the at least one semiconductor photodiode, and an interface. The radiometric measuring device can be coupled to at least one receiver by way of the interface for the purpose of interchanging data. The radiometric measuring device is designed to be supplied with electrical energy solely via the interface thereof.

12 Claims, 2 Drawing Sheets

(56) References Cited

U.S. PATENT DOCUMENTS

| | | | | |
|---|---|---|---|---|
| 2010/0252739 | A1* | 10/2010 | Damm | G01F 23/288 |
| | | | | 250/357.1 |
| 2016/0084877 | A1* | 3/2016 | Neuburger | G01D 21/00 |
| | | | | 324/126 |
| 2016/0320498 | A1 | 11/2016 | Benz et al. | |
| 2018/0003828 | A1* | 1/2018 | Dwivedi | G01T 1/161 |

FOREIGN PATENT DOCUMENTS

| | | |
|---|---|---|
| DE | 10 2013 005 226 A1 | 10/2014 |
| EP | 1 860 513 A2 | 11/2007 |
| EP | 2 187 186 A1 | 5/2010 |
| EP | 2 208 031 B1 | 4/2015 |
| WO | WO 2015/090765 A1 | 6/2015 |

OTHER PUBLICATIONS

German-language Written Opinion (PCT/ISA/237) issued in PCT Application No. PCT/EP2016/061469 dated Jul. 28, 2016 (6 pages).

* cited by examiner

RADIOMETRIC MEASURING DEVICE

BACKGROUND AND SUMMARY OF THE INVENTION

The invention relates to a radiometric measuring device.

Conventional radiometric measuring devices, for example for measuring the filling level or density, which signal their measured or process values via a current interface or a current output (4-20 mA), require an energy supply which is separate from the current interface or the current output on account of their comparatively high energy requirement.

The invention is based on the object of providing a radiometric measuring device which can be used as flexibly as possible.

The invention achieves this object by means of a radiometric measuring device having: a scintillator; at least one semiconductor photodiode, the at least one semiconductor photodiode being optically coupled to the scintillator; a signal evaluation unit which is electrically coupled to the at least one semiconductor photodiode and is designed to determine a measurement variable on the basis of a measurement signal which is generated by way of the at least one semiconductor photodiode; and an interface, the radiometric measuring device being able to be coupled to at least one receiver by way of the interface for the purpose of interchanging data; wherein the radiometric measuring device is designed to be supplied with electrical energy solely via its interface.

The radiometric measuring device may be, for example, a radiometric scintillation detector for detecting gamma or neutron radiation for measuring the filling level or density in the process industry.

The radiometric measuring device has one or more conventional scintillators. In this respect, reference is also made to the relevant technical literature.

The radiometric measuring device also has one or more semiconductor photodiodes, the semiconductor photodiode(s) being optically connected to the scintillator(s).

The radiometric measuring device also has a signal evaluation unit, for example in the form of a microprocessor and/or signal processor. The signal evaluation unit is electrically coupled to the at least one semiconductor photodiode. The signal evaluation unit is designed to determine, in particular continually (continuously) and without a measurement pause, a measurement variable on the basis of a measurement signal, for example in the form of measurement pulses, which is generated by the at least one semiconductor photodiode. For this purpose, it is possible to determine, for example, a counting rate of pulses which are generated by means of the semiconductor photodiode, in which case a filling level, a density, etc. is calculated on the basis of the counting rate. In this respect, reference is also made to the relevant technical literature. In particular, the radiometric measuring device is designed to measure continually and without a measurement pause.

The measurement variable may be, for example, a filling level, the density and/or a mass flow. The measurement variable is preferably directly determined in the radiometric measuring device itself, that is to say not only intermediate measurement variables are determined which are then used in the receiver to determine the measurement variable.

The radiometric measuring device also has an electrical interface, the radiometric measuring device being able to be coupled to at least one receiver by means of or via the interface for the purpose of interchanging data in a unidirectional or bidirectional manner. The measurement variable or its value, for example, can be transmitted to the receiver via the interface. During operation, electrical interface energy is available at the interface and is fed, for example, into the interface by the receiver by virtue of the latter impressing a voltage or a current, for example.

The radiometric measuring device is designed to be supplied with electrical energy solely via its interface. In other words, the radiometric measuring device is supplied with electrical (operating) energy solely via the interface. Further energy supplies, for example in the form of dedicated power supply units, are absent.

The radiometric measuring device may have a voltage supply device, the voltage supply device being electrically coupled to the interface and being designed to generate one or more supply voltages for the radiometric measuring device solely from a voltage present at the interface and/or solely from a current flowing via the interface. The supply voltage or voltages/currents derived from the supply voltage can be used to supply all electrical components of the radiometric measuring device.

The voltage supply device may have a voltage converter, for example in the form of a DC/DC converter, for converting the level. The voltage converter may have a step-up part and/or a step-down part. The voltage generated by the voltage converter can be used, for example, as the supply voltage for a semiconductor sensor, for example in the form of an SiPM.

It goes without saying that the voltage supply device may also have a plurality of DC/DC converters or voltage converters for converting the level, for example a voltage converter for generating voltages of greater than 20 V and a further voltage converter for generating voltages of less than 6 V.

The interface may be an analog current interface, for example a so-called 4-20 mA current loop. The latter may be designed, for example, according to the Namur standards NE006 and NE043.

The interface may also be a digital current interface or a mixed analog/digital interface (HART communication).

The interface may be a conventional field bus interface.

The interface may be a two-wire interface.

The radiometric measuring device may contain, for example, the following interfaces for process connection: Modbus interface, Profibus interface, HART interface, FOUNDATION field bus interface, Ethernet interface.

The at least one semiconductor photodiode may be a semiconductor photodiode with internal amplification, for example an avalanche photodiode (APD) or a silicon photomultiplier (SiPM).

The invention relates to a radiometric measuring device, for example in the form of a radiometric scintillation detector, for detecting gamma or neutron radiation for measuring the filling level or density in the process industry. The radiometric measuring device comprises a scintillator, one or more semiconductor photodiodes with internal amplification (APD or SiPM) and a signal processing and transmission unit. On account of the properties of the semiconductor diodes, the radiometric measuring device can be designed in a very energy-saving manner. It is therefore possible to supply the radiometric measuring device solely via its interface, for example with the electrical power available in a 4-20 mA current loop. As a result, the radiometric measuring device can also be designed in the intrinsically safe ignition protection type for applications in explosive regions and can be used in all zones, including zone 0.

The radiometric measuring device may have disintegration compensation, as a result of which it is possible to compensate for the decrease in activity as a result of the disintegration of a radioactive nuclide used for the measurement. For this purpose, the radiometric measuring device may have components which make it possible to determine the date and the time, for example a real-time clock or a radio receiver which is designed to receive GPS signals, for example, or as a receiver for receiving DCF77, MSF, JJY or WWVB signals.

The radiometric measuring device may have a non-volatile data memory for storing calibration data (application calibration data or electrical component calibration data) or manufacturing data.

The radiometric measuring device may have one or more semiconductor sensors which is/are suitable for directly detecting ionizing radiation or for detecting secondary radiation (for example scintillation light) which has been converted by means of one or more scintillators.

The radiometric measuring device may have a control device which may contain one or more functional blocks which generate one or more control signals.

One functional block may generate a control signal, for example, on the basis of the temperature or characteristic properties of the spectrum, which control signal can be used to stabilize the measuring device.

A further functional block may generate a second control signal for controlling the functional unit which transmits process values.

These functional blocks may also be distributed among a plurality of control units.

The functional unit which transmits process values may transmit its information to the receiver (for example supply isolator, PLC or process control system) in an analog or digital manner.

The radiometric measuring device may have an Ex i barrier for limiting current, voltage and power. The Ex i barrier has the property of blocking electrical energy, which is contained or stored in the measuring device, in the event of a fault or converting it into heat, with the result that it is not forwarded to the connection terminals of the measuring device and can cause an ignitable mixture to explode. With respect to the configuration of the barriers, reference is made to the relevant technical literature.

The radiometric measuring device is supplied with electrical energy solely via its interface during normal operation or measurement operation, during which it determines the measurement variable.

The radiometric measuring device may be designed in the Ex i ignition protection type or may combine this ignition protection type with further ignition protection types (for example Ex m), that is to say the radiometric measuring device may be designed in the intrinsically safe ignition protection type or as a combination of the intrinsically safe and encapsulated or intrinsically safe and pressure-resistant ignition protection type.

According to one embodiment, the interface is a current interface, the radiometric measuring device being designed to code and/or transmit the measurement variable by means of the current consumption of the radiometric measuring device. For this case, the radiometric measuring device has at least one electrical energy store, the at least one electrical energy store being able to be (re)charged by means of a charging current. The electrical energy store may be, for example, a rechargeable energy store of a real-time clock of the measuring device.

The radiometric measuring device also has a charging current controller which is designed to set the charging current on the basis of the measurement variable.

The radiometric measuring device may have a real-time clock (RTC), for example in order to determine the date needed for disintegration compensation and the time. For this case, the energy store is designed to supply the real-time clock with electrical energy when (as soon as) no (more) energy is provided via the interface. In other words, the energy store is used as a buffer store for the real-time clock.

The radiometric measuring device may have at least one adjustable ballast resistor (load) which can be used to control the current consumption of the radiometric measuring device. The charging current controller is designed to set a resistance value of the at least one ballast resistor on the basis of the measurement variable, that is to say the resistance value can be used as the manipulated variable of the charging current controller.

The charging current controller may be designed to set the resistance value of the at least one ballast resistor on the basis of the measurement variable in such a manner that a current through the at least one ballast resistor becomes minimal and the charging current becomes maximal as long as a storage or charging capacity of the electrical energy store has not yet been exhausted. If the storage or charging capacity of the electrical energy store has been exhausted, the charging current can be set to zero and excess electrical energy can be converted into thermal energy in the at least one ballast resistor.

The signal evaluation unit may be designed to check the determination of the measurement variable for possible faults, the radiometric measuring device being designed to deactivate those assemblies of the radiometric measuring device which are provided for determining the measurement variable in the event of a fault.

BRIEF DESCRIPTION OF THE DRAWINGS

The invention is described in detail below with reference to the drawings, in which.

DETAILED DESCRIPTION OF THE DRAWINGS

Figure 1:
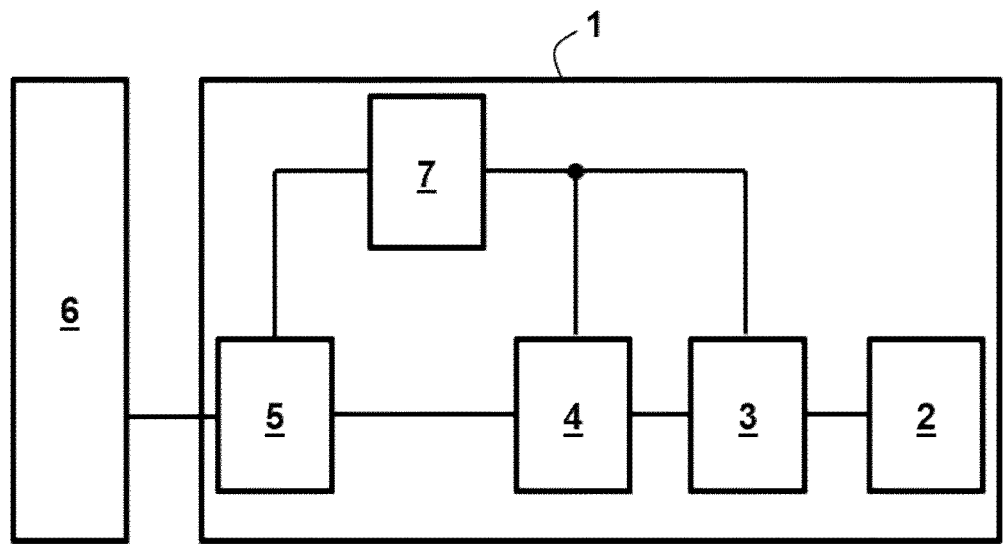
FIG. 1 schematically shows a radiometric measuring system having a radiometric measuring device according to the invention, FIG. 2 schematically shows a radiometric measuring device according to another embodiment, and FIG. 3 schematically shows a radiometric measuring device according to another embodiment.

FIG. 1 schematically shows a radiometric measuring system having a radiometric measuring device 1 which is coupled to a receiver 6 via its 4-20 mA current interface 5.

The radiometric measuring device 1 conventionally has a scintillator 2. A semiconductor photodiode 3 in the form of an SiPM is also provided, the SiPM 3 being optically coupled to the scintillator 2. The SiPM 3 converts the light pulses generated in the scintillator into electrical current pulses.

A signal evaluation unit 4 is electrically coupled to the SiPM 3. The signal evaluation unit 4 is designed to continually determine a measurement variable, for example in the form of a filling level, on the basis of a measurement signal which is generated by the SiPM 3. The signal evaluation unit 4 may also, for example, control a bias voltage of the SiPM 3, monitor a proper function of the SiPM 3, etc.

The radiometric measuring device 1 is coupled to the receiver 6 by means of its interface 5 for the purpose of interchanging data, that is to say the measured values or measurement variables determined by the radiometric measuring device 1 continually and without interruption are transmitted to the receiver 6 via the interface 5 continually and without interruption. With respect to the fundamental function of the 4-20 mA current interface, reference is made to the relevant technical literature.

The receiver 6 conventionally provides electrical interface energy by means of an impressed current or an impressed voltage. In this respect, reference is also made to the relevant technical literature for the 4-20 mA interface.

The radiometric measuring device 1 has a voltage supply device 7 which is electrically coupled to the interface 5. The radiometric measuring device 1 is supplied with voltage solely by means of the voltage supply device 7. The voltage supply device 7 takes a required portion of the available interface energy from the interface 5 and provides this portion as operating energy in the form of one or more supply voltages. Further energy sources are not available to the voltage supply device 7, that is to say the radiometric measuring device 1 is supplied with energy solely via its interface 5.

In the present case, the voltage supply device 7 supplies, by way of example, the signal evaluation unit 4 and the SiPM 3 with voltages/currents required for their operation.

The voltage supply device 7 may have one or more DC/DC converters, for example in the form of (a) boost converter(s), for the purpose of converting the voltage or adapting the level, which converter(s) generate(s) a voltage having a suitable level from a voltage present at the interface 5.

The interface 5 may have a so-called barrier which may be required for reasons of explosion protection. The barrier internally separates possibly present energy stores from the intrinsically safe loop circuit. The barrier can be dispensed with in devices which are not intrinsically safe.

The interface 5 may have a so-called process interface. The process interface is used to convert the determined measured value, for example pulses per second, or the determined measurement variable, for example filling level, density and/or mass flow, into an item of electrical information to be transmitted to the receiver, for example a 4-20 mA loop current or bus data, such as Profibus or the like.

The interface 5 may also have a modem. Communication data (for example Bell 202 for HART communication), for example, can be transmitted using the modem.

An optional energy store may be provided for the purpose of buffering the energy removed from the interface.

It goes without saying that the interface 5 may also be a field bus interface, for example a Profibus interface.

The important advantages of the radiometric measuring device 1 according to the invention are the possible use into the Ex zone 0 and/or the installation as a two-wire device. A user requires only two lines to the field device since a separate feed voltage for the radiometric measuring device 1 is not supplied. The armored cable required for this purpose in the Ex region may likewise be dispensed with. In the case of explosion-proof probes of the intrinsically safe ignition protection type, the complicated pressure-resistant encapsulation of the radiometric measuring device 1 can be dispensed with. This results in a considerable cost advantage.

Figure 2:
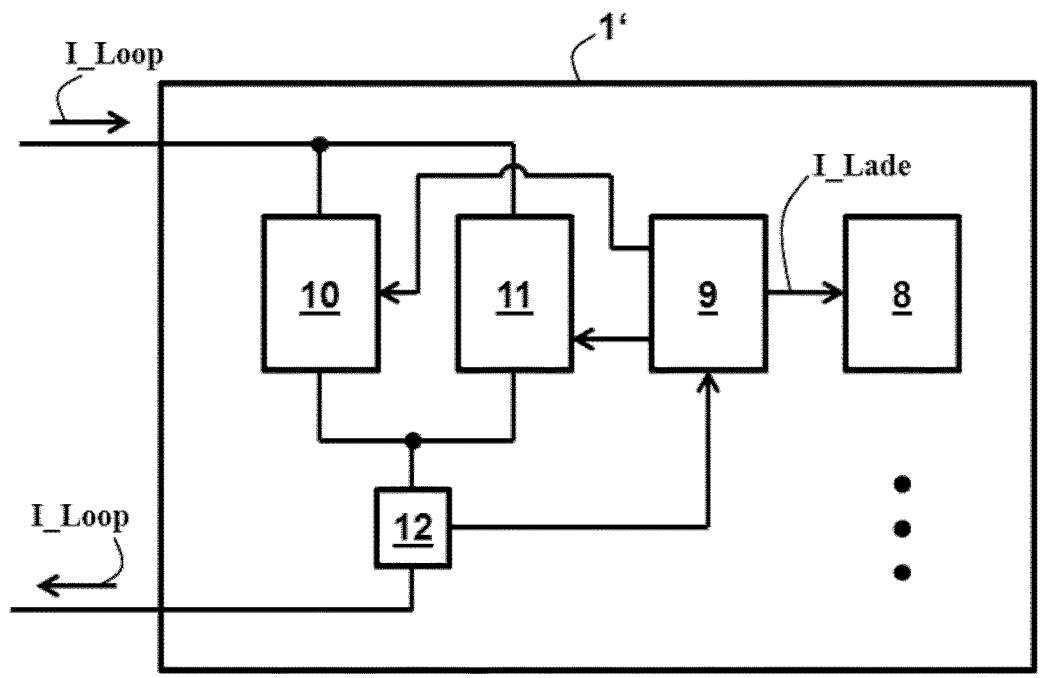

FIG. 2 schematically shows a radiometric measuring device 1' according to another embodiment. FIG. 2 illustrates only a part of the radiometric measuring device 1'. The components 2, 3, 4, 5 and 7 are obvious and, even though they are not illustrated for reasons of clarity, are likewise present. In this respect, reference is made to the statements made with respect to FIG. 1.

The interface 5, also see FIG. 1, is a current interface in this embodiment, the radiometric measuring device 1' being designed to transmit the measurement variable to the receiver 6 by means of a current consumption I_Loop of the radiometric measuring device 1'.

The radiometric measuring device 1' has an electrical energy store 8 which can be charged by means of a charging current I_Lade. The radiometric measuring device 1' also has a charging current controller 9 which is designed to set the charging current I_Lade on the basis of the measurement variable to be transmitted.

The radiometric measuring device 1' has two ballast resistors 10, 11 which are connected in parallel and can be used to control or influence the current consumption I_Loop of the radiometric measuring device 1'. The second ballast resistor 11 has a high impedance in the fault-free case and is used only to provide a second shut-off path under certain fault conditions, which shut-off path can produce a fault current in order to establish a safe state. In this respect, reference is also made to EP 1 860 513 A2.

However, since the second shut-off path must be active only in the case of a 24 mA loop current, all circuit parts of the second shut-off path are activated only when the second shut-off path is needed. This results in an energy saving.

The charging current controller 9 is designed to set a resistance value of the first ballast resistor 10 on the basis of the measurement variable to be transmitted in such a manner that a current through the first ballast resistor 10 becomes minimal and the charging current I_Lade becomes maximal.

A shunt or measuring resistor 12 is used to measure the current consumption I_Loop of the radiometric measuring device 1', the current measured in this manner being evaluated in the current controller 9 for control.

The current I_Loop represents the instantaneous measured value of the measurement variable. The current I_Loop must not fall below a predefined minimum value since the device 1' is supplied with this current. If a current which is greater than this minimum value (operating current required by the measuring device 1' itself) is needed to transmit or signal a value of a measurement variable, this is generated by means of the ballast resistor 10 which may be, for example, in the form of an active component, for example in the form of a bipolar transistor and/or a field effect transistor, thus producing a power loss which is not available for supplying the measuring device 1'.

The current controller 9 is now used to reduce the current through the ballast resistor 10 to a minimum required for the proper function, for example to 0.8 mA for HART communication. The excess current is supplied to the electrical energy store 8 as charging current I_Lade. If the energy store 8 can no longer receive the energy, the ballast resistor 10 reduces the required current. The electrical energy store 8 may be an energy store of a real-time clock, for example.

If excess energy is available in the measuring device 1', it can be used, for example, to charge the energy store 8 used to buffer the real-time clock.

It is also possible for the radiometric measuring device 1' to have an electrical display element (not shown here), for example in the form of a display, for a user and optionally additionally an input element (not shown here), for example in the form of a keyboard, for example having three, four, five, six or more keys, therefor. The display or its background lighting can be continuously activated. Alternatively, the display or its background lighting can be deactivated most of the time and can be activated for a particular period if necessary by means of key actuation. In principle, excess energy can be buffered in the measuring device 1' so that background lighting of the display or the display itself can be activated in the case of user interaction.

The signal evaluation unit 4 has a diagnostic device which is designed to check the determination of the measurement variable for possible faults, the radiometric measuring device being designed to deactivate those assemblies, the semiconductor photodiode 3 by way of example in the present case, of the radiometric measuring device which are provided for determining the measurement variable in the event of a fault.

If the signal evaluation unit 4 or its diagnostic device detects a fault, the measuring device should generate a loop current I_Loop of <3.6 mA in accordance with Namur NE 43. As a result, the energy available to the measuring device falls further. This is potentially not possible on account of the measuring device's own energy consumption. Therefore, the measuring device is designed to shut off individual energy consumers or functional assemblies of the measuring device 1, 1'.

According to the invention, the measurement variable is no longer determined in the event of a fault since it can be disputed whether the measurement variable can still be correctly determined on account of the fault. This results in the possibility of deactivating those assemblies of the radiometric measuring device which are provided for determining the measurement variable. These may be, for example, the semiconductor photodiode 2 or its voltage supply, operational amplifiers, comparators, including an analog voltage supply, which need to be shut off. The energy consumption of the measuring device is therefore significantly reduced, as a result of which a loop current I_Loop of <3.6 mA can then be signaled.

For the rest, the embodiment shown in FIG. 2 corresponds to that shown in FIG. 1, with the result that reference is also made, in this respect, to the statements and features of the embodiment shown in FIG. 1 in order to avoid repetitions.

Figure 3:
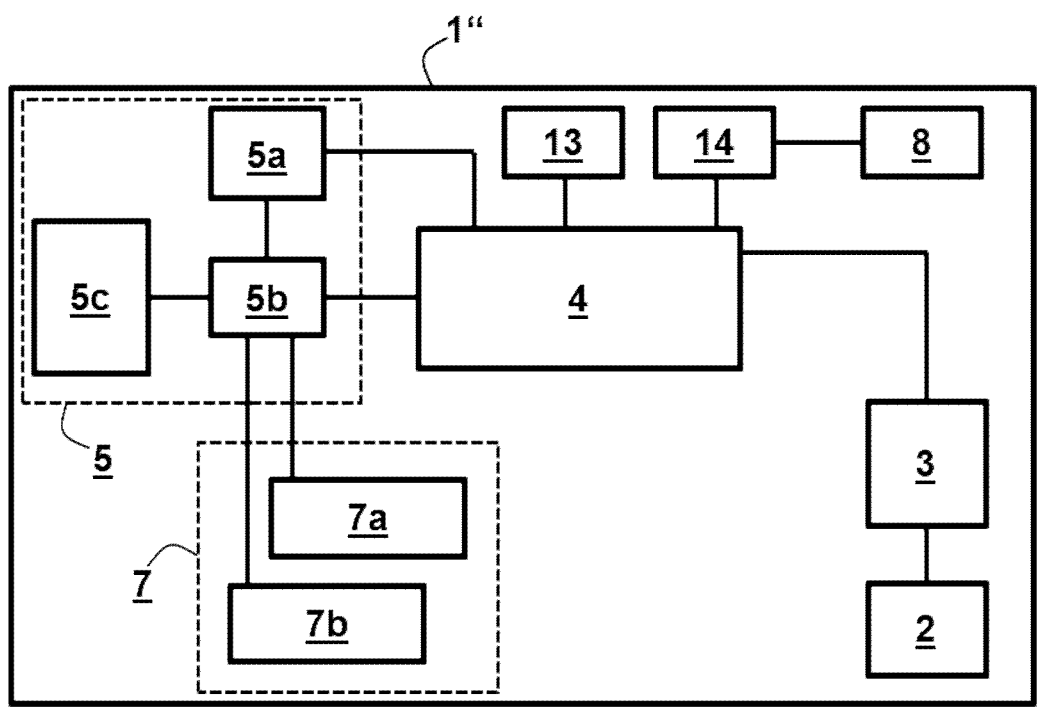

FIG. 3 schematically shows a radiometric measuring device 1" according to another embodiment.

In this embodiment, the interface 5 has a modem 5a, a process interface 5b and an Ex i barrier 5c.

Furthermore, the signal evaluation unit 4 is assigned a non-volatile data memory 13 which is used to store calibration data (application calibration data or electrical component calibration data) or manufacturing data.

Furthermore, the signal evaluation unit 4 is assigned a real-time clock 14, the electrical energy store 8 being designed to supply the real-time clock 14 with electrical energy when no electrical energy is provided via the interface 5. The interface 5 may be designed like the current interface shown in FIG. 2, that is to say may have the charging current controller 9, the ballast resistors 10, 11 connected in parallel and the shunt or measuring resistor 12.

The signal evaluation unit 4 carries out disintegration compensation, the real-time clock 14 being used, inter alia, to determine a date needed for disintegration compensation and a time.

For the rest, the embodiment shown in FIG. 3 corresponds to that shown in FIG. 1 and FIG. 2, with the result that reference is also made, in this respect, to the statements and features of the embodiment shown in FIGS. 1 and 2 in order to avoid repetitions.

What is claimed is:

1. A radiometric measuring device, comprising:
   a scintillator;
   at least one semiconductor photodiode, the at least one semiconductor photodiode being optically coupled to the scintillator;
   a signal evaluation unit which is electrically coupled to the at least one semiconductor photodiode and is designed to determine a measurement variable on the basis of a measurement signal which is generated by way of the at least one semiconductor photodiode;
   an interface, the radiometric measuring device being able to be coupled to at least one receiver by way of the interface for the purpose of interchanging data; and
   at least one adjustable ballast resistor which is used to control the current consumption of the radiometric measuring device, wherein
      the radiometric measuring device is designed to be supplied with electrical energy solely via its interface,
      the interface is a current interface, the radiometric measuring device being designed to code the measurement variable by way of a current consumption of the radiometric measuring device,
      the radiometric measuring device has at least one electrical energy store which is chargeable by way of a charging current,
      the radiometric measuring device has a charging current controller which is designed to set the charging current on the basis of the measurement variable, and
      the charging current controller is designed to set a resistance value of the at least one ballast resistor on the basis of the measurement variable.

2. The radiometric measuring device as claimed in claim 1, further comprising:
   a voltage supply device, wherein
      the voltage supply device is electrically coupled to the interface and is designed to generate a supply voltage for the radiometric measuring device from a voltage present at the interface and/or from a current flowing via the interface.

3. The radiometric measuring device as claimed in claim 2, wherein
   the voltage supply device has a voltage converter.

4. The radiometric measuring device as claimed in one of claims 1, wherein
   the interface is an analog current interface or a digital current interface.

5. The radiometric measuring device as claimed in claim 1, wherein
   the interface is a field bus interface.

6. The radiometric measuring device as claimed in claim 1, wherein
   the interface is a two-wire interface.

7. The radiometric measuring device as claimed in claim 1, wherein
   the at least one semiconductor photodiode is a semiconductor photodiode with internal amplification.

8. The radiometric measuring device as claimed in claim 1, wherein
   the at least one semiconductor photodiode is an avalanche photodiode or a silicon photomultiplier.

9. The radiometric measuring device as claimed in claim 1, further comprising:
a real-time clock, wherein
the electrical energy store is designed to supply the real-time clock with electrical energy when no electrical energy is provided via the interface.

10. The radiometric measuring device as claimed in claim 1, wherein
the charging current controller is designed to set the resistance value of the at least one ballast resistor on the basis of the measurement variable in such a manner that a current through the at least one ballast resistor becomes minimal and the charging current becomes maximal.

11. The radiometric measuring device as claimed in claim 1, wherein
the signal evaluation unit is designed to check the determination of the measurement variable for possible faults, the radiometric measuring device being designed to deactivate those assemblies of the radiometric measuring device which are provided for determining the measurement variable in the event of a fault.

12. The radiometric measuring device as claimed in claim 1, wherein
the signal evaluation unit is designed to determine the measurement variable continually and without a measurement pause.

* * * * *